July 4, 1933.   J. E. PADGETT   1,916,891
TRANSMISSION GEARING WITH REAR CLUTCH
Filed Dec. 23, 1931    5 Sheets-Sheet 1

July 4, 1933.   J. E. PADGETT   1,916,891
TRANSMISSION GEARING WITH REAR CLUTCH
Filed Dec. 23, 1931   5 Sheets-Sheet 5

INVENTOR
Joseph E. Padgett
BY Bodell & Thompson
ATTORNEYS

Patented July 4, 1933

1,916,891

UNITED STATES PATENT OFFICE

JOSEPH E. PADGETT, OF TOLEDO, OHIO, ASSIGNOR TO SPICER MANUFACTURING CORPORATION, OF TOLEDO, OHIO, A CORPORATION

TRANSMISSION GEARING WITH REAR CLUTCH

Application filed December 23, 1931. Serial No. 582,812.

This invention relates to change speed transmission gearings for motor vehicles, and particularly to that class of transmission gearings which have a rear clutch for disconnecting the gearing from the propeller shaft of the vehicle during gear shifting operations, and has for its object a particularly simple and efficient power means for operating the rear clutch and the control of the power means by the shifting of the gears into and out of shifted position. It further has for its object, a power means which is operated by the vacuum in the manifold of the internal combustion engine of the vehicle to which the gearing is applied. Other objects appear throughout the specification.

The invention consists in the novel features and in the combinations and constructions hereinafter set forth and claimed.

In describing this invention, reference is had to the accompanying drawings in which like characters designate corresponding parts in all the views.

This transmission gear includes generally, the usual gear set located in a gear box in the usual manner, a normally engaged rear clutch, gear shifting mechanism including a lever shiftable from neutral to effect different gear changes, and means controlled by the shifting of the lever to neutral position for disengaging the rear clutch and by the movement of the lever out of neutral position to engage the clutch.

This invention is here illustrated as embodied in a gearing having a main and an auxiliary gear set, in which the main gear set may be used independently of the auxiliary set, or the auxiliary set used in conjunction with the main gear set to multiply and modify the number of speeds produced by the main set, for instance, if the main set is capable of producing four speeds forward and a reverse, the auxiliary set, when shifted, can be used to produce additional speeds forward, and an additional reverse.

1 designates the main gear box, and 2 the auxiliary gear box at the rear end of the main gear box. 3 designates generally, the main gear set, and 4 the auxiliary gear set.

The main gear set comprises a drive shaft 5, transmission shaft 6 in line therewith, a countershaft 7, intermeshing gears 8, 9 on the drive shaft and the countershaft respectively, shiftable gears 10 and 11 on the transmission shaft 6, and gears 12, 13 and 14 on the countershaft with which the sliding gears coact. The gears 8 and 10 are provided with coacting gear clutch faces, and the gear 10 is shiftable forwardly to engage the gear clutch faces to produce direct drive through the main gear set. The gear 10 is also shiftable rearwardly from neutral into engagement with the gear 12 on the countershaft. The gear 11 is a double gear and is shiftable forwardly to engage the gear 15 thereof with the gear 13 on the countershaft, and rearwardly to engage the gear 16 thereof with the gear 14. The reverse gearing is not shown.

Engagement of the gears 11 and 14 produces first speed forward, and the gears 15 and 13 second speed forward, and engagement of the gears 10 and 12 third speed forward, and engagement of the clutch faces of the gears 8 and 10 fourth or high speed.

Figure 1:
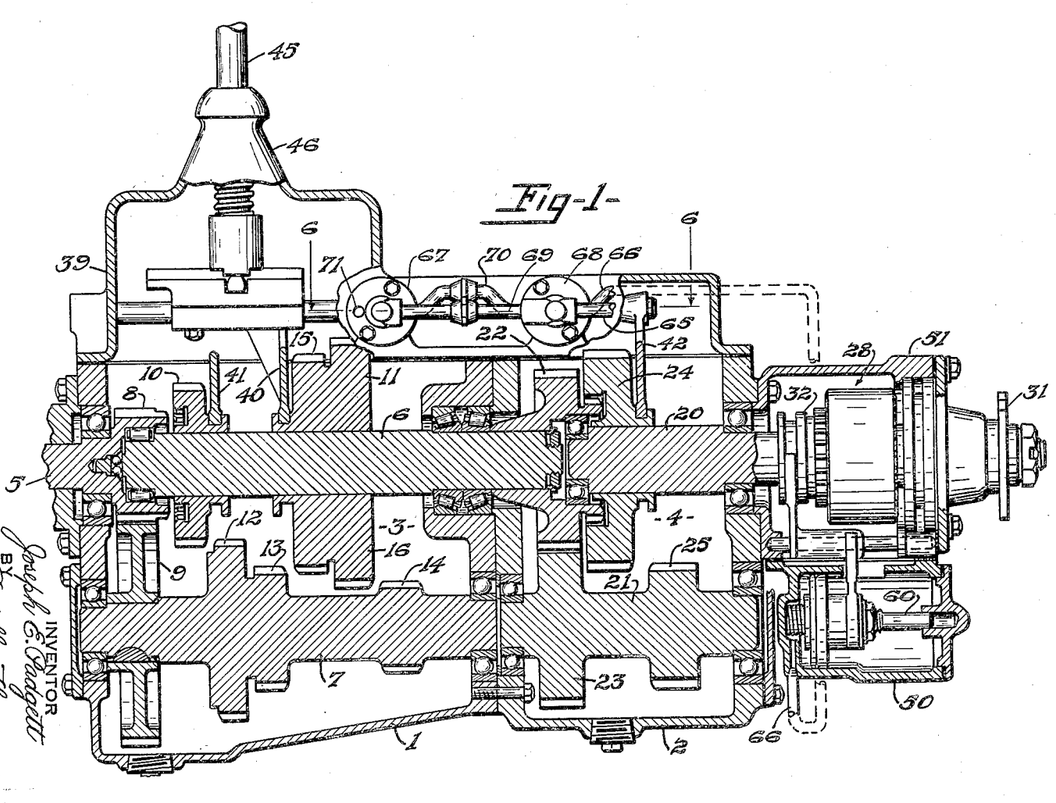
Figure 1 is a fragmentary, longitudinal, sectional view of one form of gearing embodying my invention.
Figure 2:
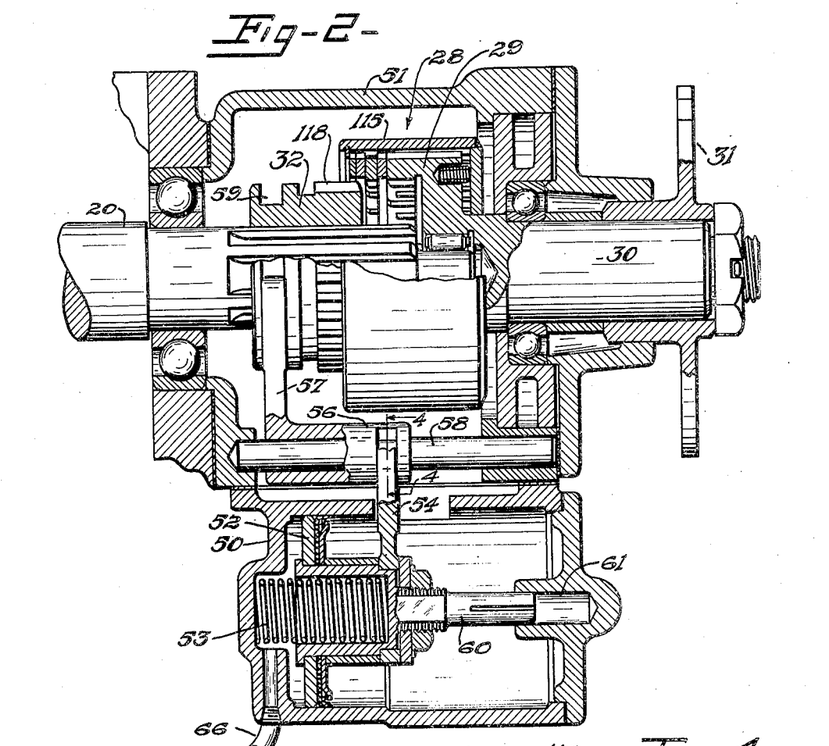
Figure 2 is an enlarged, vertical, sectional view through the rear clutch and the operating mechanism therefor.
Figure 3:
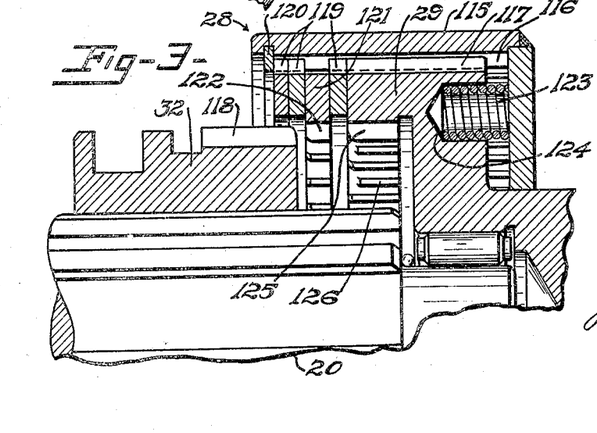
Figure 3 is an enlarged, fragmentary view of the rear clutch.
Figure 4:
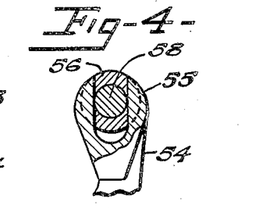
Figure 4 is a sectional view on line 4—4, Figure 2.

The auxiliary gear set includes a shaft 20 alined with the transmission shaft 6, a countershaft 21, intermeshing gears 22 and 23 mounted respectively on the rear end of the transmission shaft 6 and the countershaft 21, and a shiftable gear 24 slidable on the shaft 20. The gears 22 and 24 have coacting gear clutch faces, and the gear 24 is normally arranged as shown in Figure 1, wherein these clutch faces are engaged. The gear 24 is shiftable to carry the clutch faces out of engagement, and the gear 24 in mesh with the gear 25 on the countershaft 21. When only the different speed changes effected through the main gear set 3 are used, the clutch faces of the gears 22 and 24 are engaged. When, however, the speed changes effected by the main gear set 3 are to be modified, the gear 24 is shifted into engagement by the gear 25. The gear mechanism forms no part of this invention. The drive shaft 5, as will be understood, is connected to the crank shaft of the engine 26 through the usual clutch operated by the pedal 27 in the usual manner.

28 designates the rear clutch including a section 29 secured in any suitable manner to a shaft 30 having a coupling for connection to the propeller shaft of the vehicle. 31 designates a portion of the coupling. The coupling is usually a universal joint. The clutch also includes a shiftable section 32 slidable axially of the rear end of the shaft 20 of the auxiliary gearing, the clutch sections being normally engaged and the section 32 being keyed or splined to the shaft 20.

The various gear changes are made with a conventional selecting and gear shifting lever, and as the gearing here shown includes an auxiliary gear set, the gearing includes a set of shifters for the main gear set, and an auxiliary shifter for the auxiliary set, and preferably both the main and auxiliary shifters are operated by a single selecting and gear shifting lever, although the means for operating the shifters per se forms no part of this invention.

In transmission gearings, the shifters are usually shift rods, and for convenience are referred to hereinafter as shift rods, although they may be any other form of shifter.

35, 36, and 37, designate the main shift rods, and 38 the auxiliary shift rod. These rods are suitably guided in the usual manner in the cap 39 of the gear box, and have the usual blocks formed with sockets for coacting with the selecting and gear shifting lever, and forks connected to the gears to be shifted. The rod 35 is the first and second speed rod, the rod 36 the third and fourth speed rod, and the rod 37 the reverse rod. The rod 35 has a fork 40 coacting with the double gear 11, the rod 36 has a fork 41 coacting with the gear 10, and the rod 37 a similar fork, not shown, coacting with the reverse gear. The auxiliary rod 38 has a fork 42 coacting with the shiftable gear 24 of the auxiliary set.

45 designates the selecting and gear shifting lever, this having means at its lower end for selectively engaging the rods 35, 36 and 37, and for selecting and shifting the auxiliary rod 38. Suitable means are provided for locking the remaining shifter rods of the main set from shifting, when one of the rods is in shifted position. This locking means will be referred to later as it also forms part of the connections for controlling the flow of power to the motor which operates the rear clutch. The gear shifting lever 45 is mounted in the usual manner in the tower 46 on the cap 39.

The means for operating the rear clutch, that is, shifting the section 32 thereof, is a pressure or fluid operated motor comprising a cylinder 50 mounted on the housing 51 for the rear clutch, a piston 52 in the cylinder and connected to the shiftable clutch section 32, a conduit system connected to the cylinder, and to a source of power, and control valve means in said conduit and operated preferably by the shift rods, the valve means being operated to open position, that is, open the conduit to the power fluid, when one of the shift rods is moved to neutral position, the valve means being moved to closed position, when the shift rods are moved into a shifted position. The clutch is here shown as engaged by a spring 53 acting on the piston 52 and the piston is connected to the shiftable clutch section through an arm 54 movable with the piston, and having a fork 55 working in a groove in the hub 56 of a fork 57, the hub being slidable along a rod 58 in the housing 51. The fork 57 works in a suitable groove 59 in the clutch section 32. The piston 52 is here shown as having a tail-rod 60 slidable in a guide 61.

Preferably, the vacuum produced in the manifold of the internal combustion engine, which is of the four cycle type, is utilized to exhaust the air from the cylinder 50 so that atmospheric pressure will actuate the piston to move it against the action of the spring 53 and disengage the rear clutch. As there are two sets of shift rods, the valve means includes two valves.

The conduit system includes a pipe 65 connected to the manifold of the engine, a conduit 66 connected to the cylinder 50, and valve casings 67 and 68 with pipes 69 and 70 connecting them, the valve casing 67 having a vent passage 71 communicating with the outer air. As there are two sets of shift means, the valve means include two valves located in the casings 67 and 68 respectively, both of these valves being closed (Figure 8) when one of the main shift rods 35, 36 or 37 is in shifted position, and the shift rod 38 is in either of its shifted positions so that the conduit system is vented through the passage 71 to the outer air.

Figure 5:
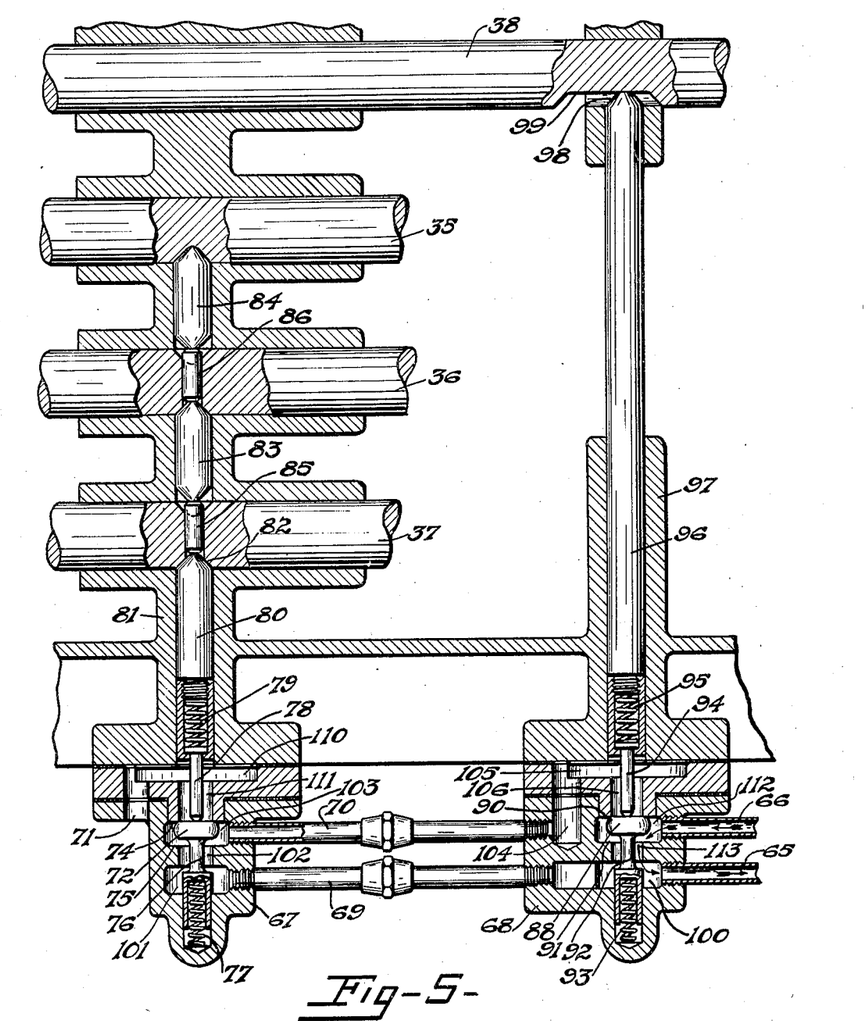
Figure 5 is a fragmentary plan view, partly in section and parts being omitted, of the sets of shift rods and the connections between the same and the valves which control the operation of the rear clutch.
Figure 6:
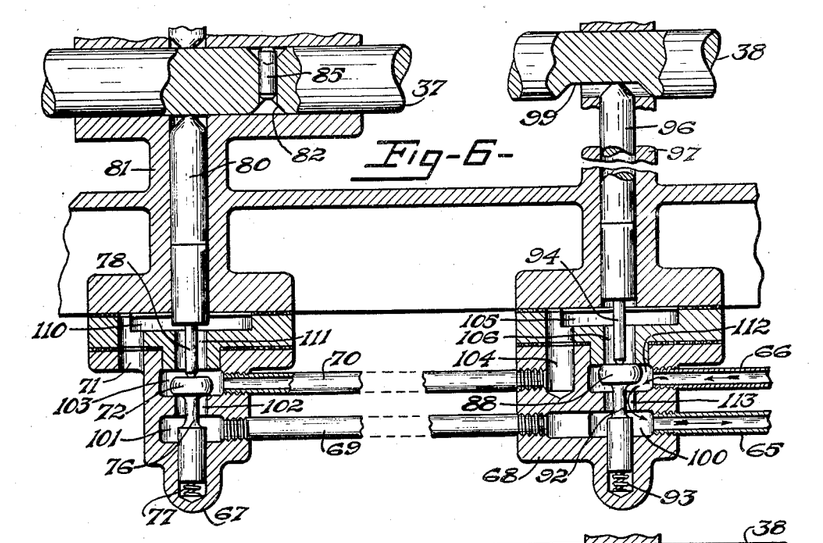
Figure 6 is a sectional view, partly broken away, taken approximately on the plane of line 6—6, Figure 1, showing the positions of the valves which control the vacuum when the auxiliary shift rod is in neutral, and one of the main shift rods is in shifted position.

The system is vented to the outer air when the rear clutch is engaged. When the auxiliary shift rod 38 is being shifted, or passing through its neutral position from one shifted position to the other (Figures 5 and 6), the valve operated by the main shift rods 35, 36, and 37, is opened because of all of these rods being in neutral position, the valve in the casing 68 is open and the air will be exhausted from the cylinder 50, as indicated by the arrow in Figures 5 and 6, and the rear clutch disengaged. Also, as seen in Figure 7, the conduit system is opened to the vacuum when one of the main rods 35, 36, or 37, is in neutral position, and the auxiliary rod 38 in shifted position.

Figure 7:
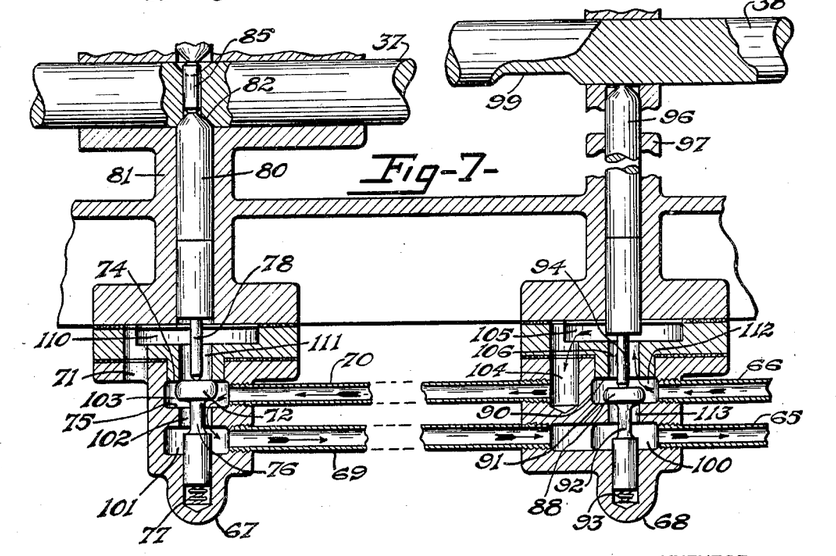
Figure 7 is a view similar to Figure 6 showing the positions of the valves when the auxiliary shift rod is in shifted position, and all of the main shifter rods are in neutral.

72 designates the valve operated by the main shift rods 35, 36, and 37, and 88 the valve operated by the auxiliary rod 38, the valve 88 being connected in the conduit system in position to cut out, or short circuit, the valve 72 when the main shift rods are in shifted position, and the auxiliary rod operated or shifted out of its normal position through its neutral position into its shifted position where the gears 24 and 25 are engaged, or vice-versa, and to connect the two valve cases in series when the valve 88 is closed, Figure 7.

The valve 72 includes a head engageable with opposing seats 74 and 75, and has a stem 76 acted on by a spring 77 normally thrusting the head 72 against the seat 74 and thus cutting out the air passage 71 when the shift rods 35, 36, and 37, are in neutral. When the shift rods 35, 36, 37 are in neutral, or shifting toward neutral, a stem 78 thrusts against the head of the valve 72 through a spring 79. A slide 80 movable in a suitable guide 81 thrusts against the spring, the slide having a cam shaped end coacting with a cam shaped socket 82 in the shift rod 37. Similar slides 83 and 84 are interposed between the rods 37 and 36, and 36 and 35. These slides 83, 84 are of such length that the movement of one rod thrusts the slide into interlocking engagement with the next rod, or thrusts the cam shaped end thereof in the socket of the next rod. Thus, when any one rod 35, 36, or 37, is shifted, the next rods are locked from shifting movement. The endwise movement of any one of these slides is transferred to the next slide through additional slides or pins 85 and 86 interposed between the ends of the slides 84 and 83, and 83 and 80, these pins being slidable in transverse passages in the rods opening through the bottoms of the sockets. The valve 72 is opened only when the shift rods 35, 36, and 37, are in neutral position, and immediately when any one of these rods is shifted out of neutral position, the slides will be forced endwise thus closing the valve 72 on seat 75, and when the valve 72 is opened away from seat 75, the cylinder 50 will be subject to the vacuum, as will be hereinafter described. The valves 72 and 88 are referred to as being open when they connect the cylinder 50 with the vacuum line 65.

88 designates the other valve movable between two seats 90 and 91, and having a stem 92 which is pressed by a spring 93 to hold the head against the seat 90. A stem 94 thrusts against the head 88, and a slide rod 96 movable in a suitable guide 97 acts on the spring 95. This slide has a cam shaped end 98 coacting with the elongated cam shaped recess 99 in the auxiliary rod 38 while the shift rod 38 is passing through neutral. The end 98 is only engaged in the recess 99 when the gear 24 is being shifted either out of its position as shown in Figure 1, and into position where the gear 24 meshes with the gear 25, or when the gear 24 is being shifted back to its normal position, wherein it is clutched in direct drive relation to the transmission shaft 6. This gear 24 has no idle neutral position, but its position assumed when passing from either one to the other of its engaged positions may be considered a neutral position.

Figure 8:
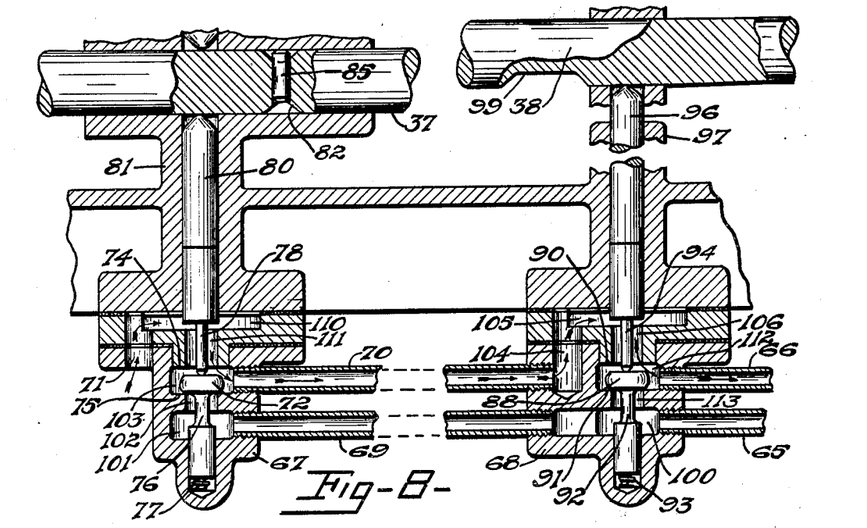
Figure 8 is a view similar to Figure 6 showing the position of the valves when both the main shift rod and the auxiliary shift rod is in shifted position.

Therefore, when the gear 24 is in its position shown in Figure 1, in which it is clutched in direct drive relation to the transmission shaft 6, the slide 96 and valve 88 are in their positions shown in Figures 7 and 8, in which the valve 88 is closed, and if one of the shift rods 35, 36, 37, is in shifted position, the valve 72 is in its position shown in Figure 8, so that the valve 72 closes and cuts off the vacuum through the pipe 65, and the outer air is free to flow to the cylinder 50 permitting the spring 53 to hold the rear clutch engaged, the flow of air through the valves being as shown by the arrows in Figure 8.

When however, one of the main shift rods 35, 36, or 37 is shifted toward neutral position, the movement of that rod causes the valve 72 and the slide 80 to be pressed outwardly, and the spring 77 to move the valve 72 from its position shown in Figure 8 to that shown in Figure 7, bearing in mind that the valve 88 is in its position shown in Figures 7 and 8 as the gear 24 is in direct drive relation to the transmission shaft 6. Upon the opening of the valve 72, the vacuum of the manifold is effective in the cylinder 50 through the pipe 65, chamber 100 of valve casing 68, pipe 69, chamber 101 of valve casing 67, passage 102, and chamber 103, thence through pipe 70, passage 104, chamber 105, passage 106 of the valve casing 68, and through pipe 66 to the cylinder 50, the flow of air due to the vacuum being as shown by the arrows in Figure 7, so that the rear clutch is disengaged.

Thus, with the auxiliary gearing in either its normal position shown in Figure 1, or its shifted position wherein the gear 24 is in mesh with the gear 25, the valve 88 is in its position shown in Figure 7, and the air flows under the influence of the vacuum, as shown in Figure 7 when any gear shifts are made in the main gearing 3, that is, when any one of the shift rods are being moved to neutral.

As the gear shift is being completed, the valve 72 moves in its position shown in Figure 8, in which the outer air is free to flow to the cylinder 50 and permit the spring 53 to react to reengage the rear clutch, the air flowing in through the air inlet 71, through chamber 110 of valve casing 67, passage 111, chamber 103, pipe 70, passage 104, chamber 105 of valve casing 68, passage 106, chamber 112, and thence, through pipe 66 to the cylinder 50. When however, the valve 72 is in its position shown in Figure 8 wherein the valve casing 67 is open to the outer air through the passage 71 by reason of one of the shift rods 35, 36, 37 being in a shifted position out of neutral, and the auxiliary shift rod 38 is operated, the valve 88 is shifted into the position shown in Figure 6 so that the valve casing 67 is cut out of the vacuum circuit, and the cylinder is connected into the vacuum circuit through pipe 66, Figure 6. chamber 112, passage 113, and chamber 100 of valve casing 68 thence, through pipe 65 to the manifold, so that piston 52 is subject to the vacuum and throws out the rear clutch while the shift rod 38 is passing through neutral, and the cam end of the rod 96 is in the depression 99 of the auxiliary rod 38. It is therefore apparent that when any one of the shift rods 35, 36, 37, is shifted to neutral, or the shift rod 38 shifted through neutral, the cylinder 50 will be cut in through a closed vacuum circuit so that the rear clutch will be thrown out. and that when the rod is completing its shifting movement from neutral, the vacuum circuit will be broken, and the cylinder 50 open to the outer air so that the spring 53 is free to react to reengage the rear clutch.

The gear shifting mechanism embodies means by which this auxiliary rod 38 can be operated when one of the main shift rods, as the shift rod 35 which effects first and second gear ratios is either in neutral or shifted position and hence, the valve 88 is used in order to connect the cylinder 50 in a vacuum circuit when the rod 35 is in a shifted position and the auxiliary rod 38 being shifted.

In ordinary transmission gearings with no auxiliary rods, or in a transmission gearing wherein the auxiliary rod can be shifted only when all the main gear shift rods are in neutral position, the valve 88 would not be necessary. Both the main shift rods and the auxiliary rod are shiftable with a single selecting and shifting lever, but this feature forms no part of my invention, and insofar as this feature of the invention is concerned wherein a valve 88 is used, the auxiliary shift rod 38 may be shifted with its own lever.

The valve casings 67 and 68 are mounted, as shown in Figure 1, on the side of the cap 39 of the gear box, in which cap are also located the shift rods.

The rear clutch preferably embodies synchronizing means and one section, that is, the section 29 which is rotatable with the shaft 30, is located in a drum 115 and capable of a sliding movement therein, the drum being formed with internal splines 116 in the form of gear teeth, and the section 29 having complemental splines 117 slidably interlocked therewith. The section 28 is provided with internal clutch gear teeth. The shiftable section 32 is provided with complemental gear teeth 118 for finally interlocking with the internal gear teeth of section 28. A friction, or synchronizing clutch means, is interposed between the sections 32 and 29.

Figure 9:
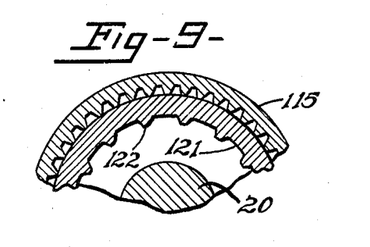
Figures 9 and 10 are fragmentary detail views of parts of the rear clutch.
Figure 10:
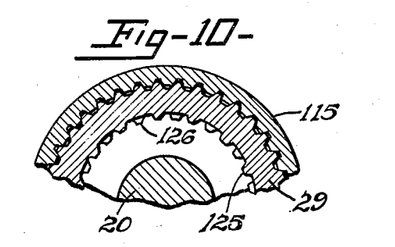
Figure 11:
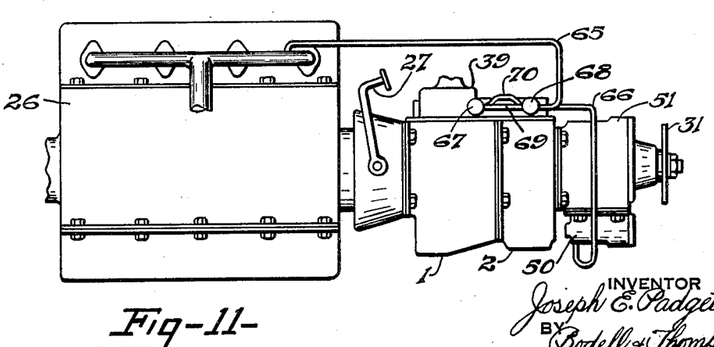
Figure 11 is a diagrammatic plan view of the power plant including an internal combustion engine, and gear shifting mechanism, and connections between the cylinder which operates the rear clutch and the manifold of the engine through the control valves.

This synchronizing means consists of friction disks 119 interlocked with the drum 115 and held in position within the drum by a locking ring 120; and a friction disk 121 interleaved with, or located between two of the disks 119. One of the disks 119 thrusts against the front end of the section 29. The disk 121 is provided with internal teeth 122 for interlocking with the teeth 118 of the section 32. Springs 123 are interposed between the head of the drum 115 and the bottoms of sockets 124 in the section 29 to thrust the drum 28 outwardly and through the lock ring or abutment 120, thrust the friction disks together with a yielding pressure. Some of the teeth, as every alternate tooth 126 of the section 29, are set back, or are shorter than the other teeth 125. Likewise, the teeth of the section 32 are similarly formed. As the clutch section 32 moves inwardly, the teeth 118 thereof first interengage with the teeth 122 of the disk 121, and as the disks 119 and 121 are pressed together by the springs 123, the rotation of the sections 29 and 32 is synchronized through the friction disk, and thereafter the clutch section 32 moves further inwardly, the teeth 118 interlocking with the teeth 125, 126, the shorter teeth permitting a wide entrance for the longer teeth of the section 118, and as the sections rotate relatively to each other, one of the longer teeth of section 32 will engage the side face at one end of one of the longer teeth of section 29, thus alining the teeth of both sections so that they will come into full mesh without clashing. The teeth 122 of the synchronizing disk 121 are, as seen in Figure 9, spaced apart twice or more times the distance of the teeth of the section 32. This is to facilitate the interlocking of the section 32 with the disk 121. The construction of the clutch forms the subject matter of another application.

What I claim is:

1. In a transmission gearing having a normally engaged rear clutch, a gear shifting lever operable from neutral to effect different gear changes, and power means for disengaging the clutch including a member for controlling the flow of power and being normally in position wherein the power is cut off, and means, operated by the shifting lever when shifted into neutral position, for operating said member to effect the flow of power, and when shifted out of neutral position to operate said lever to cast off the flow of power, whereby the clutch reengages.

2. In a transmission gearing having a normally engaged rear clutch, a gear shifting lever operable from neutral to effect different gear changes, power means for operating the clutch including a vacuum operated motor having a movable member connected to the clutch to shift the same, a conduit system connecting the motor and a source of vacuum, a normally closed valve in said conduit system, and means operated by the gear shifting lever for opening said valve when the gear shifting lever is moved to neutral position and to close said valve when the gear shifting lever is moved out of neutral position.

3. In a transmission gearing having a normally engaged rear clutch, a gear shifting lever movable from neutral to effect different gear changes, means for shifting the rear clutch including a spring for normally holding the clutch engaged, a cylinder having a piston therein, and connections between the piston and the rear clutch for shifting it against the spring, a conduit connected to the cylinder and to a source of power, a normally closed valve in said conduit, and means operated by the gear shifting lever when moving to and from neutral position to open and close said valve.

4. In a transmission gearing having a normally engaged rear clutch, a gear shifting lever movable from neutral to effect different gear changes, means for shifting the rear clutch including a spring for normally holding the clutch engaged, a cylinder having a piston therein, and connections between the piston and the rear clutch for shifting it against the spring, a conduit connected to the cylinder and to a source of power, a normally closed valve in said conduit, and means operated by the gear shifting lever for moving to and from neutral position to open and close said valve; in combination with an internal combustion engine and a main clutch connecting the crank shaft of the engine and the main shaft of the gearing, said conduit being connected to the intake manifold of the engine, whereby when the valve in the conduit is opened, the piston is actuated by the vacuum created in the manifold.

5. In a transmission gearing having a normally engaged rear clutch, means for operating the clutch including a cylinder and piston, connections between the piston and the clutch to shift the same, a conduit system connecting the cylinder to a source of power, a valve in said conduit, gear shifting mechanism including a shift rod movable from neutral, a gear shifting lever for operating said rod, and connections for operating the valve, the last connections coacting with the rod to be operated thereby during the movement of the rod to and from shifted position.

6. In a transmission gearing having a normally engaged rear clutch, means for operating the clutch including a cylinder and piston, connections between the piston and the clutch to shift the same, a conduit connecting the cylinder to a source of power, a valve in said conduit, gear shifting mechanism including a plurality of shift rods movable in opposite directions from neutral, and a selecting and gear shifting lever operable to select and shift any one of the rods, and connections actuated by any one of the rods for operating the valve during the movement of the selected rod to neutral position to open the valve, and out of neutral position to close the valve.

7. In a transmission gearing having a normally engaged rear clutch, means for operating the clutch including a cylinder and piston, connections between the piston and the clutch to shift the same, a conduit connecting the cylinder to a source of power, a valve in said conduit, gear shifting mechanism including a plurality of shift rods movable in opposite directions from neutral, and a selecting and gear shifting lever operable to select any one of the rods and shift the same, the rods having cam shaped sockets in their sides, connections comprising slides interposed between the rods and having their ends arranged to enter the sockets, the slides being of such length that when one end thereof is out of one socket, the other end is seated in the socket of the adjacent rod, means for transferring the endwise movement of one slide to the next, an additional slide operated by the last slide of the series and coacting with the valve to close it, and means tending to open the valve.

8. In a change speed transmission gearing having a normally engaged rear clutch, means for operating the clutch including a cylinder and a piston, connections between the piston and the clutch to shift the same, a conduit connecting the cylinder to a source of power, a normally closed valve means in the conduit, gear shifting mechanism including two sets of shifters operable independently of each other, and means for operating them, and connections operated by a shifter of either set for operating to open the conduit to the power, when the shifter is moved from its shifted position and closing the valve means when the shifter is moved into its shifted position.

In testimony whereof, I have hereunto signed my name, at Toledo, in the county of Lucas, and State of Ohio, this 27th day of November, 1931.

JOSEPH E. PADGETT.